US012716553B2

(12) United States Patent
Aoun et al.

(10) Patent No.: US 12,716,553 B2
(45) Date of Patent: Aug. 25, 2026

(54) STORAGE FACILITY FOR A LIQUID-STATE GAS COMPRISING A TANK AND A SUCTION DEVICE OF AN INSULATION LAYER OF SAID TANK

(71) Applicant: GAZTRANSPORT ET TECHNIGAZ, Saint Remy les Chevreuse (FR)

(72) Inventors: Bernard Aoun, Saint Remy les Chevreuse (FR); Laurent Spittael, Saint Remy les Chevreuse (FR); Pierre-Emmanuel De Seze, Saint Remy les Chevreuse (FR); Fabrice Lombard, Saint Remy les Chevreuse (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 8 days.

(21) Appl. No.: 18/706,806

(22) PCT Filed: Nov. 15, 2022

(86) PCT No.: PCT/FR2022/052088

§ 371 (c)(1),
(2) Date: May 2, 2024

(87) PCT Pub. No.: WO2023/099829

PCT Pub. Date: Jun. 8, 2023

(65) Prior Publication Data

US 2024/0410529 A1 Dec. 12, 2024

(30) Foreign Application Priority Data

Nov. 30, 2021 (FR) ...................................... 2112757

(51) Int. Cl.
*F17C 13/00* (2006.01)
*B65D 90/02* (2019.01)
*F17C 1/12* (2006.01)

(52) U.S. Cl.
CPC .......... *F17C 13/001* (2013.01); *B65D 90/028* (2013.01); *F17C 1/12* (2013.01);
(Continued)

(58) Field of Classification Search
CPC .............. F17C 2260/037; F17C 13/001; F17C 2203/0629; F17C 2203/0631;
(Continued)

(56) References Cited

U.S. PATENT DOCUMENTS 3,913,341 A * 10/1975 Katsuta ................. F17C 13/126 73/40.7
2023/0027471 A1* 1/2023 Beier ..................... B64D 37/08

FOREIGN PATENT DOCUMENTS

FR 2 271 499 A1 12/1975
FR 2 832 211 A1 5/2003
(Continued)

OTHER PUBLICATIONS

International Search Report mailed on Mar. 1, 2023 in PCT/FR2022/052088 filed on Nov. 15, 2022, 2 pages.

*Primary Examiner* — Atif H Chaudry
(74) *Attorney, Agent, or Firm* — Oblon, McClelland, Maier & Neustadt, L.L.P.

(57) ABSTRACT

A storage facility includes a tank for transporting and/or storing gas in a liquid state, the tank including at least one insulation layer, a gas-consuming device, and one device for suctioning the gas present in the insulation layer. The suction device includes a primary branch fluidly connected to the gas-consuming device, at least one secondary branch fluidly connected to the insulation layer of the tank and through
(Continued)

Figure 1:
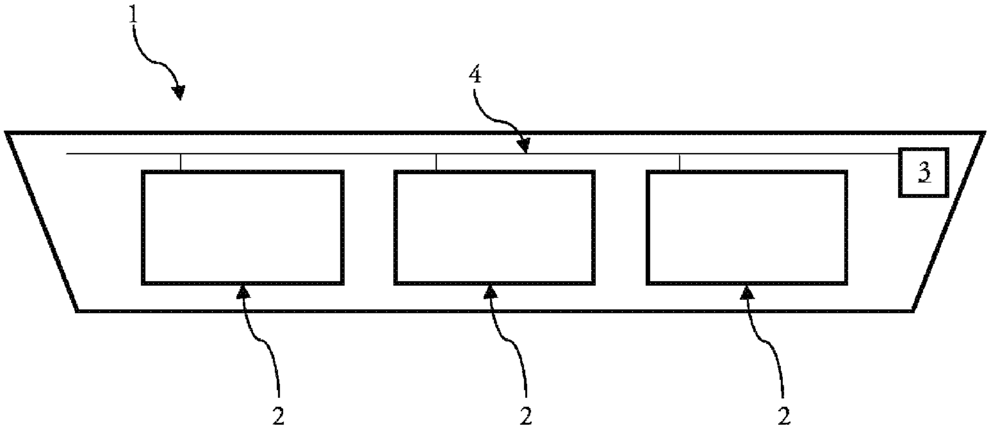

which the gas from the insulation layer flows, and at least one suction member configured to suction the gas flowing through the secondary branch.

11 Claims, 2 Drawing Sheets

(52) U.S. Cl.
CPC ................ *F17C 2203/0358* (2013.01); *F17C 2203/0626* (2013.01); *F17C 2203/0629* (2013.01); *F17C 2203/0631* (2013.01); *F17C 2223/0161* (2013.01); *F17C 2227/0114* (2013.01); *F17C 2260/037* (2013.01)

(58) Field of Classification Search
CPC ...... F17C 2203/0626; F17C 2223/0161; F17C 2203/03; F17C 2203/0358; F17C 3/04; F17C 2227/0114; F17C 1/12; B63B 25/16; B65D 90/028
See application file for complete search history.

(56) References Cited

FOREIGN PATENT DOCUMENTS

| | | | | |
|---|---|---|---|---|
| FR | 2 942 199 | A1 | 8/2010 | |
| WO | WO-2015078972 | A1 * | 6/2015 | ........... G01N 1/2226 |

* cited by examiner

STORAGE FACILITY FOR A LIQUID-STATE GAS COMPRISING A TANK AND A SUCTION DEVICE OF AN INSULATION LAYER OF SAID TANK

The present invention relates to the field of gas storage facilities in a liquid state and more particularly relates to a tank for transporting and/or storing gas in a liquid state arranged within such storage facilities.

In the industry of gas storage facilities in liquid state, it is essential, during the transport and/or storage of gas in liquid state, to maintain this gas in liquid state and at low temperature, said gas having a very low vaporization temperature. For this purpose, the gas in a liquid state is stored in tanks comprising several layers of insulation, ensuring both impermeability by means of a sealing membrane and a thermal protection by means of a layer of thermal insulation formed by thermally insulating boxes or panels.

However, in exceptional cases, leaks may occur in one or other of the sealing membranes. The gas in liquid state flowing at the leak evaporates, as it is no longer thermally insulated. Monitoring systems exist to detect these leaks as soon as possible and to act accordingly.

Sometimes the leakage is extremely small. This type of leak is difficult to detect because of the minor loss of liquid-state gas.

Furthermore, the insulation spaces where the gas leaks are depolluted by an inerting system, but this system implies a loss of the leaking gas in one way or another and thus leads to a waste of the gas cargo. That is because this gas leakage is not used by the gas consumption system on board, but rather released into the atmosphere.

The present invention provides a solution for avoiding the loss of gas following a minor leak, by providing a storage facility for a gas in a liquid state comprising at least one tank for transporting and/or storing gas in a liquid state and at least one gas-consuming device, said tank comprising at least one insulation layer, the storage facility comprising at least one device for suctioning a gas present in the insulation layer, the suction device comprising at least one primary branch fluidly connected to the gas-consuming device and at least one secondary branch fluidly connected to the insulation layer of the tank and through which the gas from the insulation layer flows, the suction device comprising at least one suction member configured to suction the gas flowing through the secondary branch.

With the suction device integrated into the storage facility, any evaporation of gas within the insulation layer due to a minor leak is treated by suctioning said gas and using it as fuel for the gas-consuming device. The minor leak is thus temporarily treated, as the gas is drawn off as it flows through the leak. Moreover, the loss of this gas is avoided, with the suction device ensuring the recovery of at least a significant part of the leaking gas.

According to one aspect of the invention, all of the gas drawn in by the suction device is used as fuel and sent to the gas-consuming device.

The tank of the storage facility is suitable for transporting and/or storing the gas in a liquid state. The storage facility can be a vessel such as an LNG tanker and transport a cargo of gas in a liquid state to a destination in order to deliver said cargo. The storage facility can also be a container ship, a gas-powered ferry or bulk carrier, a Floating Liquid Natural Gas (FLNG) unit, a Floating Storage Regasification Unit (FSRU), a floating storage barge or a Gravity Based Support (GBS) platform for storing gas in a liquid state. The insulation layer provides both sealing and thermal insulation to keep the gas in a liquid state in the tank and at low temperature. It is thus understood that in view of the precautions taken to transport and/or store the gas in a liquid state, it is exceptionally rare that a potential leakage thereof within the insulation layer occurs. However, the storage facility according to the invention allows this possibility to be overcome.

The gas-consuming device is able to consume the gas from the tank. The storage facility can, for example, use the gas in liquid and/or vapor state exclusively as fuel, or in the case of a transport vessel, use part of the gas cargo in liquid and/or vapor state as fuel. The gas in a liquid and/or vapor state can also be used as a fuel to supply the storage facility with electricity. The gas can also be directed to a gas combustion unit to be consumed and avoid the outgassing of the gas, for example methane, other hydrocarbon gases, dihydrogen or ammonia, into the atmosphere.

In order to be consumed by the gas-consuming device, the suctioned gas must comprise a fuel. For example, the gas contained in the tank can be liquefied natural gas (LNG), liquefied petroleum gas (LPG), ammonia, green hydrogen, hydrogen in a liquid state, an alcohol such as methanol or ethanol, or any other variant of the above-mentioned gases produced from renewable energy sources.

According to a feature of the invention, the primary branch can be flowed through by a drive gas. The drive gas, by its circulation, can participate in the suction occurring in the secondary branch in order to suction the gas coming from the insulation layer in case of a leak. With the secondary branch fluidly connected to the insulation layer, the gas is suctioned until it reaches the suction member, which circulates the gas through the primary branch to the gas-consuming device.

According to a feature of the invention, the suction member is an ejector comprising a first inlet connected to the primary branch, a second inlet connected to the secondary branch and an outlet fluidly connected to the gas-consuming device, the ejector being supplied with the drive gas. When the suction member is an ejector, the drive gas flows through said ejector from the first inlet to the outlet. As the drive gas is expanded as it passes through the ejector, a pressure differential is created, resulting in a suction at the second inlet and thus at the secondary branch.

The gas suctioned into the secondary branch then joins the primary branch at the ejector outlet and mixes with the drive gas. The gas mixture then flows through the primary branch to the gas-consuming device.

According to a feature of the invention, the suction member is a compression member that suctions gas flowing through the secondary branch, the compression member comprising an outlet port fluidly connected to the gas-consuming device. For this reason, many types of compression devices exist, ranging from a pneumatic system to induce a translational movement, to an electrical system or gas drive system for a rotational movement. The outlet port allows the compression member to be fluidly connected to the gas-consuming device.

According to a feature of the invention, the compression member is supplied with the drive gas. The compression member is activated, for example by being rotated, by the flow of the drive gas and thereby creates a suction within the secondary branch in order to recover the leaking gas. Once drawn in, the gas passes through the outlet port and circulates to the gas-consuming device.

According to one feature of the invention, the drive gas may be dinitrogen. Dinitrogen is a fluid already produced and used on board as an inert gas to purge pipes and to inert insulation layers. The dinitrogen, more particularly the circuit in which the dinitrogen circulates, for example for use as a working fluid, thus has the advantage of extending along all the tanks if the storage facility is provided with a plurality of tanks. It is therefore easy to divert the function of the dinitrogen, that is inerting, and to use it as a drive gas for the suction of the gas in the insulation layer, as long as the dinitrogen circuit is within reach of the tank.

According to a feature of the invention, the compression member comprises a compressor and an electrical source supplying the compressor. In such a configuration, the operation of the compression member is carried out electrically and not by means of the drive gas. Such an electrical source is an electric motor. The advantage of the compressor is that no drive gas is fed to the gas-consuming device. The electrical source can be activated manually or automatically, for example, when gas is detected in the insulation layer.

According to a feature of the invention, the secondary branch comprises a non-return valve arranged between the insulation layer and the suction member. The non-return valve allows the flow of a fluid from the insulation layer to the suction member but prevents any flow from the suction member to the insulation layer. The non-return valve thus prevents gas from flowing back into the insulation layer, for example undesired circulation of the drive gas within the secondary branch or gas flowing back into the insulation layer.

According to a feature of the invention, the storage facility comprises a circuit for inerting the insulation layer, the secondary branch being connected to the inerting circuit, the inerting circuit comprising a valve isolating the secondary branch from the inerting circuit. The inerting circuit ensures the renewal of the volume of inert gas within the insulation layer and also allows the evacuation of gas, for example methane, other gaseous hydrocarbons, dihydrogen or ammonia, present within said insulation layer in case the tank leaks. The inerting circuit comprises a source of inert gas, for example dinitrogen, which is injected into the insulation layer. The inerting circuit then ensures that the injected dinitrogen is removed from the insulation layer and circulated to the atmosphere or to the consumer, according to the invention.

In order to detect a potential leakage of the insulation layer, the storage facility may for example comprise an analysis module connected to the inerting circuit and making it possible to detect the presence of gas, such as methane, a sign of leakage within the insulation layer.

The inerting circuit, in particular the outlet portion to the atmosphere, can therefore be branched with the secondary branch, thus reducing the number of additional pipes required to design the storage facility according to the invention. In order to isolate the inerting circuit from the secondary branch, however, the branching of the secondary branch implies the arrangement of the valve. The inerting circuit may also comprise an additional valve. Thus, by opening one of the valves and closing the other valve, the fluid connection to the insulation layer can be made with the inerting circuit or with the suction device. This choice can for example depend on whether or not gas is detected by the analysis module, if it is integrated into the storage facility.

According to a feature of the invention, the storage facility comprises at least two suction devices, the tank comprising a first insulation layer in contact with the gas in liquid state contained in the tank and a second insulation layer surrounding the first insulation layer, the secondary branch of a first suction device being fluidly connected to the first insulation layer, the secondary branch of a second suction device being fluidly connected to the second insulation layer. Each of the insulation layers comprises a sealing membrane and a thermal insulation layer, which respectively ensure impermeability and thermal insulation of the tank. The presence of two layers of insulation thus provides additional security for the gas cargo in a liquid state, both in terms of impermeability and thermal insulation. Since the probability of the tank leaking is very low, but not non-existent, the storage facility according to the invention can be configured to suction the gas within the two insulation layers in order to fully secure the tank. Each of the two suction devices is implemented within its own insulation layer. Both suction devices are fluidly connected to the gas-consuming device, as well as to a source of drive gas if the drive members of said drive devices are operated by means of the drive gas. The suction member of each of the suction devices can therefore be the ejector or the compression member, powered electrically or by the drive gas, as described above.

According to a feature of the invention, the suction member is configured to suction a maximum of 14 $m^3$ of gas per hour within +/−25%. Thus, if the gas leakage results in a gas flow within the insulation layer of less than or equal to 14 $m^3$ of gas per hour, then the leaking gas is at least partially suctioned and sent to the gas-consuming device, and thus results in less dispersion of a greenhouse gas in the case of methane or a hazardous gas such as dihydrogen or ammonia into the atmosphere.

According to a feature of the invention, the gas-consuming device is selected from an internal combustion engine, a gas boiler, a gas combustion unit, and an electricity generator. The gas-consuming device can thus use the gas from the tank and/or the leaking gas to ensure the propulsion of the storage facility if it is intended to move, or to ensure the power supply of said storage facility. The gas can also be fed into a gas boiler to produce steam to power a third party storage facility. In case the gas-consuming device is a gas combustion unit, the leaking gas is burned and sent to the atmosphere.

Figure 2:
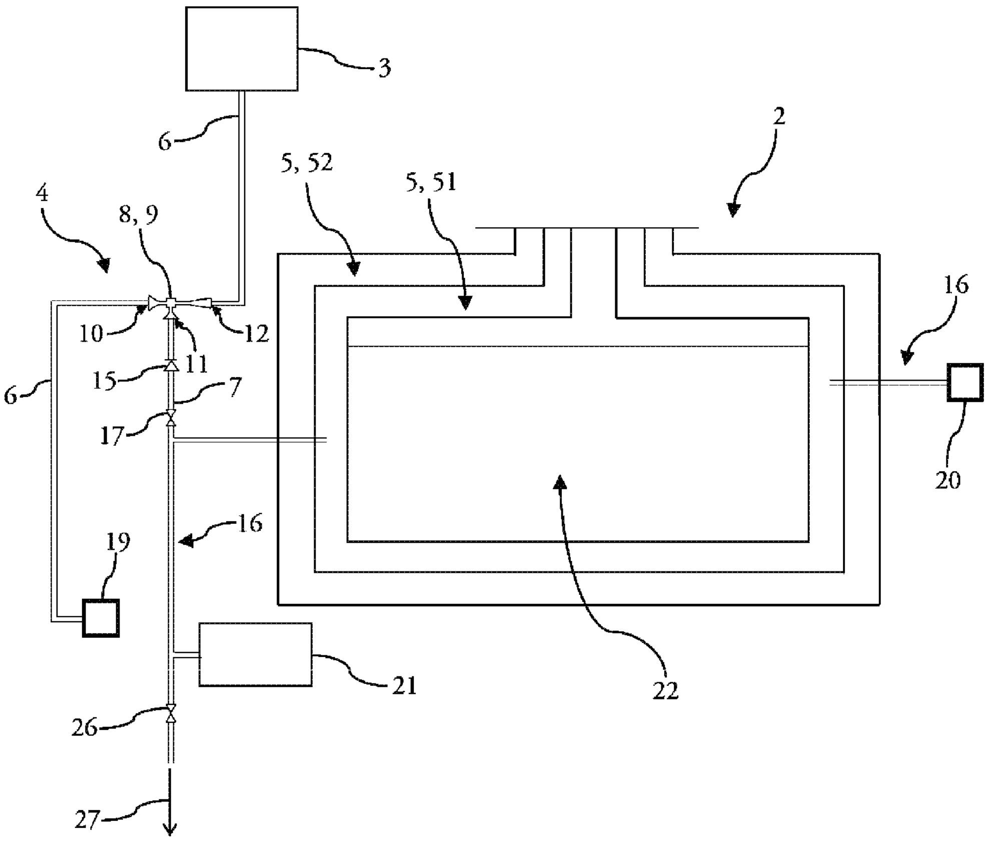
Figure 3:
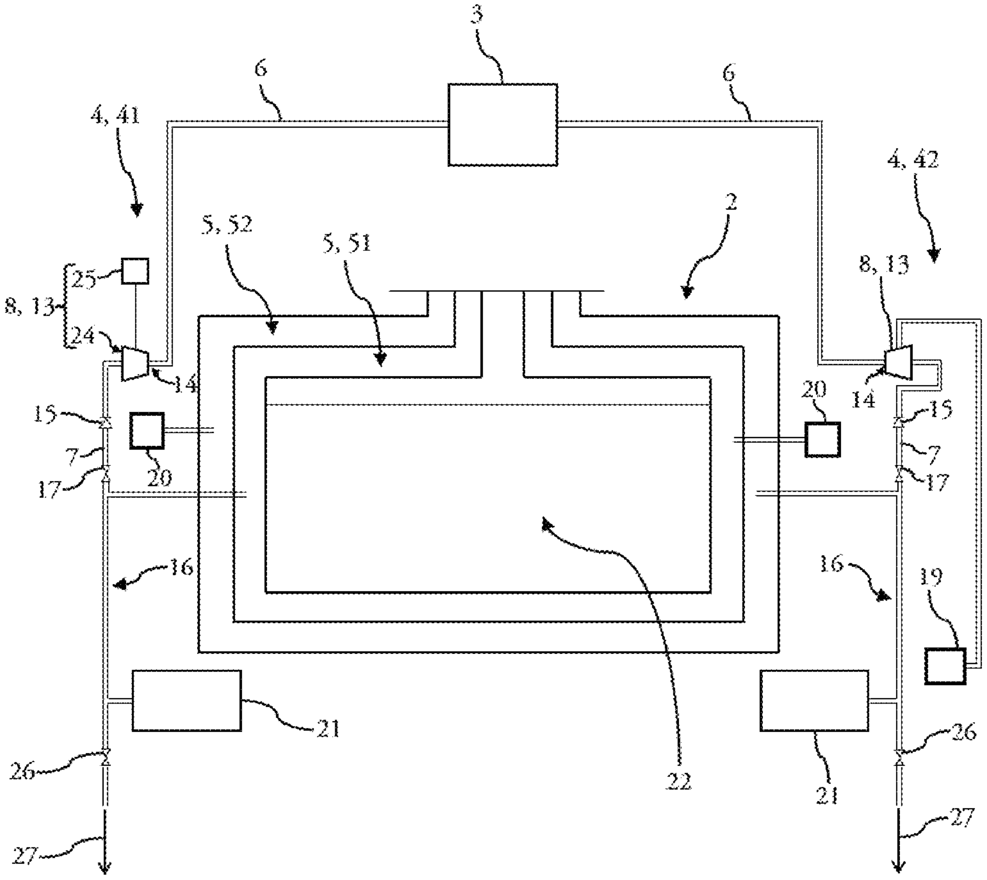

Other features and advantages of the invention will appear both from the description which follows and from several exemplary embodiments, which are given for illustrative purposes and without limitation with reference to the appended schematic drawings, in which:

FIG. 1 is a schematic diagram of a storage facility for a gas in a liquid state according to the invention, FIG. 2 shows a tank for transporting and/or storing gas in a liquid state and a device for suctioning an insulation layer of the storage facility shown in FIG. 1, FIG. 3 represents an alternative installation of the storage facility according to the invention.

FIG. 1 shows a storage facility 1 for a gas in a liquid state, which comprises at least one tank 2 for transporting and/or storing gas in a liquid state. In FIG. 1, three tanks 2 are shown, but the storage facility 1 can contain any number of tanks 2. In FIG. 1, the storage facility 1 shown is a vessel. The liquid-state gas contained in the tanks 2 may, for example, be a cargo to be transported by the vessel to a given destination. The liquid-state gas can also be a simple fuel for the vessel whose function is other than to transport a cargo of gas in its liquid state. According to other examples, the storage facility 1 can also be a floating liquefaction unit, a regasification unit, a floating storage barge or a gravity platform ensuring the storage of gas in a liquid state.

The storage facility 1 comprises at least one gas-consuming device 3. That device can, for example, be an internal combustion engine ensuring the propulsion of the storage facility 1 if it is intended to move. The gas-consuming device 3 can also be an electricity generator providing power to the storage facility 1, a gas boiler producing steam as energy for a third-party consumer, or a gas combustion unit configured to burn gas. The gas-consuming device 3 is able to consume the vaporous gas contained in the tanks 2 as fuel. When the gas has to be in the vapor state to be consumed, the liquid-state gas contained in the tank 2 can be evaporated. The evaporation of the gas can be the result of a natural evaporation of the gas in a liquid state formed in a headspace of the tanks 2 or a forced evaporation in order to obtain fuel for the gas-consuming device 3. The storage facility 1 according to the invention may be able to use the gas evaporated from the headspace of the tanks 2 or the liquid-state gas once vaporized, and is characterized in that it comprises a suction device 4 which is able to suction the vapor-state gas located within an insulation layer of at least one of the tanks 2. The gas in the vapor state may sometimes find its way into the insulation layer of one of the tanks 2 in the exceptional event that a leak occurs in said tank 2. The suction device 4 is then able to suction this gas in the leaking vapor state and circulate it to the gas-consuming device 3 to supply same with fuel. The storage facility 1 according to the invention at least limits the loss of gas as a result of a leakage, and in the case of a minor leakage with a relatively low flow rate can at least partially suction the leaking gas, thus avoiding a loss of the leaking gas. All of the gas suctioned by the suction device 4 is used as fuel and fed to the gas-consuming device 3.

FIG. 2 shows a tank 2 and a detailed suction device 4 to better describe same. FIG. 2 also shows the insulation layers 5 of the tank 2. More specifically, the tank 2 comprises a first insulation layer 51 in contact with the liquid-state gas 22 contained in the tank 2 and a second insulation layer 52 surrounding the first insulation layer 51.

Each insulation layer 5 comprises a waterproof membrane for sealing the insulation layer 5 and a thermal insulation layer of thermally insulating boxes or panels for thermal insulation of the liquid gas 22. The presence of two layers of insulation 5 ensures the reinforcement of the safety of the gas cargo in a liquid state 22 as well as its maintenance at low temperature.

As mentioned above, despite all the precautions taken, a leakage of the first layer of insulation 51 may occur in exceptional cases. In case of a major leak, it is quickly detected and an emergency procedure can be implemented to ensure the safety of the storage facility and its crew. If the leak is minor, it may be difficult to locate, and the leakage rate is relatively small but should not be overlooked. The suction device 4 is thus adapted to address the problem of leaking gas within the first insulation layer 51 in the case of a minor leak.

For this purpose, the suction device 4 comprises a primary branch 6, a secondary branch 7, and a suction member 8. The primary branch 6 is fluidly connected to the aforementioned gas-consuming device 3 while the secondary branch 7 is fluidly connected to the first insulation layer 51.

The suction member 8, as shown in FIG. 2, is an ejector 9. The ejector 9 implements a pressure differential to generate a suction. For this purpose, the ejector comprises a first inlet 10, a second inlet 11, and an outlet 12. The first inlet 10 and the outlet 12 are connected to the primary branch 6, while the second inlet 11 is connected to the secondary branch 7. The primary branch 6 is further fluidly connected to a drive gas source 19 which circulates a drive gas through the primary branch 6. The drive gas flows through the ejector 9 via the first inlet 10 and then through the outlet 12. The properties of the ejector 9 allow to lower the pressure of the drive gas passing through it and to create a pressure differential which leads to suction at the second inlet 11 and thus at the secondary branch 7.

Thus, if a leakage causes gas evaporation within the first insulation layer 51 or a leakage of gas in the vapor state, the gas is suctioned into the secondary branch 7 and flows to the ejector 9 via the second inlet 11 thanks to the pressure differential generated by the passage of the drive gas. The suctioned exhaust gas then mixes with the drive gas in the ejector 9. The mixture exits the ejector via the outlet 12 and flows to the gas-consuming device 3, which consumes the suctioned gas. The suction member 4 is configured to suction a maximum of 14 $m^3$ of gas per hour within +/−25%, which can at least partially compensate for the gas flow in the first insulation layer 51 in case of a minor leak.

The drive gas must flow in small quantities through the primary branch 6 so as not to affect the correct operation of the gas-consuming device 3. As an example, an LNG vessel engine consumes about 1800 $m^3$/hour of gas at a speed of about 12 knots. The drive gas can be, for example, dinitrogen. The advantage of dinitrogen is that a dinitrogen flow can be implemented throughout the storage facility for various functions, for example for use as an inert gas, including in the vicinity of the tanks 2 and the gas-consuming device 3. It is therefore easy to divert the flow of dinitrogen for use in the suction device 4. In FIG. 2, only one gas-consuming device 3 is supplied, but the suction device can supply a plurality of gas-consuming devices 3.

The secondary branch 7 comprises a non-return valve 15 between the first insulation layer 51 and the suction member 8. The non-return valve 15 allows the flow of gas drawn from the first insulation layer 51 to the suction member 8 and prevents the flow of gas in the opposite direction. The non-return valve 15 thus prevents a backflow of drive gas to the first insulation layer 51.

The storage facility further comprises an inerting circuit 16 which makes it possible, in particular, to renew the inert gas within the insulation layers 5 and also to evacuate potential hydrocarbons or ammonia or dihydrogen present in these same insulation layers 5. For this purpose, an inerting gas, namely dinitrogen, is circulated by a dinitrogen source 20 within the insulation layers 5, in this case the first insulation layer 51. The gas contained in the latter is then suctioned and circulates in the inerting circuit 16 in order to be sent to the atmosphere 27 afterwards.

The storage facility may comprise an analysis module 21, connected to the inerting circuit 16, which analyzes the gas suctioned through the inerting circuit 16 for potential hydrocarbons or ammonia or dihydrogen, which are signs of a leak within the first insulation layer 51.

As the inerting circuit 16 is potentially integrated within the storage facility in question, it is possible to use it partially to set up the suction device 4. For example, it is useful to use the pipe opening within the first insulation layer 51 for both the inerting circuit 16 and the suction device 4, as shown in FIG. 2. The drive gas source 19 and the dinitrogen source 20 can also be one and the same source.

In order to isolate the inerting circuit 16 from the suction device 4, the storage facility may comprise a valve 17 positioned at the secondary branch 7 and an additional valve 26 positioned at the inerting circuit 16. When inerting of the first insulation layer 51 is required, the additional valve 26 is opened and the valve 17 is closed so that the gas flowing through the inerting circuit 16 flows to the atmosphere 27. When the suction device 4 is operated, the valve 17 is open and the additional valve 26 is closed so that the suction member 8 can suction the gas circulating through the first insulation layer 51. The opening and/or closing of the valve 17 and additional valve 26 can be implemented depending on whether gas is detected by the analysis module 21.

FIG. 3 shows an alternative installation of the storage facility according to the invention, in particular of the suction member 8 and the surrounding pipework of the tank 2. Only those features that differ from those described in FIG. 2 will be described here and reference will be made to the description of FIG. 2 for features common to FIGS. 2 and 3.

The variant differs from the one described in FIG. 2 in that the storage facility comprises two suction devices 4, namely a first suction device 41 suctioning gas into the first insulation layer 51 and a second suction device 42 suctioning gas into the second insulation layer 52, in the exceptional case that a leakage leads to the presence of gas in a liquid or gaseous state within the two insulation layers 5. The elements of the suction device 4 are thus all doubled so that each of the insulation layers 5 can be treated by one of the suction devices 4. In FIG. 3, the two suction devices 4 are fluidly connected to one and the same gas-consuming device 3, but it is possible that each suction device 4 is fluidly connected to its own gas-consuming device 3.

The inerting circuit 16 can also be doubled in order to inject dinitrogen within the two insulation layers 5. Thus, in FIG. 3, two sources of dinitrogen 20 are shown, as well as two outlets to the atmosphere 27, each of the inerting circuits 16 managing one of the two insulation layers 5. The storage facility may also comprise two analysis modules 21, each connected to one of the inerting circuits 16. Each analysis module 21 has the function of detecting gases in its own insulation layer 5.

According to the variant shown in FIG. 3, the suction member 8 of the first suction device 41 and the suction member 8 of the second suction device 42 are a compression member 13.

The compression member 13 of the first suction device 41 comprises a compressor 24 and an electrical source 25. The electrical source 25 supplies power to the compressor 24 to ensure its operation, for example in rotation, and thus suctions the gas via the secondary branch 7. The compressor 24 comprises an outlet port 14 where the suctioned gas exits to supply the gas-consuming device 3.

As with the ejector 9 shown in FIG. 2, the compression member 13 of the second suction device 42 is also supplied with drive gas. It is the latter that drives the operation of the compression member 13, for example in rotation, and ensures the suction of the gas potentially present in the second insulation layer 52. Like the compressor 24, the compressor 13 has an outlet port 14 from which the intake gas and the drive gas exit in order to flow to the gas-consuming device 3. As shown in FIG. 2, the drive gas is derived from the drive gas source 19.

Each of the suction devices 4 shown in FIG. 3 may incorporate any of the suction members 8 described above, namely the ejector described in FIG. 2 or one of the compression members 13. Similarly, the suction device described in FIG. 2 is also functional if the suction member 8 is one of the compression members 13 shown in FIG. 3.

Of course, the invention is not limited to the examples that have just been described, and numerous modifications can be made to these examples without departing from the scope of the invention.

The invention, as just described, achieves its intended purpose and makes it possible to propose a storage facility comprising a tank of gas in a liquid state, a gas-consuming device and a suction device for suctioning the gas leaking from the tank in order to feed it to the gas-consuming device. Variants not described here could be implemented without departing from the context of the invention, since, in accordance with the invention, they comprise a storage facility according to the invention.

The invention claimed is:

1. A storage facility for gas in a liquid state comprising:
- at least one tank for transporting and/or storing the gas in the liquid state, the tank including at least one insulation layer;
- at least one gas-consuming device;
- at least one device for suctioning gas present in the insulation layer, the suction device including:
  - at least one primary branch fluidly connected to the gas-consuming device,
  - at least one secondary branch fluidly connected to the insulation layer of the tank and through which the gas from the insulation layer flows, and
  - at least one suction member configured to suction the gas flowing through the secondary branch;
- a circuit for inerting the insulation layer, wherein an inerting gas is circulated by a dinitrogen source within the insulation layer, the secondary branch being connected to the inerting circuit, the inerting circuit including a valve isolating the secondary branch from the inerting circuit:
- an analysis module, connected to the inerting circuit, which analyzes the gas suctioned through the inerting circuit; and
- an additional valve positioned at the inerting circuit, the storage facility being configured to, by opening one of the valves and closing the other valve, make the fluid connection to the insulation layer with the inerting circuit or with the suction device, depending on whether or not gas is detected by the analysis module.

2. The storage facility according to claim 1, wherein the primary branch is flowed through by drive gas.

3. The storage facility according to claim 2, wherein the drive gas is dinitrogen.

4. The storage facility according to claim 2, wherein the suction member is an ejector comprising a first inlet connected to the primary branch, a second inlet connected to the secondary branch, and an outlet fluidly connected to the gas-consuming device, the ejector being supplied with the drive gas.

5. The storage facility according to claim 2, wherein the suction member is a compression member which suctions the gas flowing through the secondary branch, the compression member comprising an outlet port fluidly connected to the gas-consuming device.

6. The storage facility according to claim 5, wherein the compression member is supplied with the drive gas.

7. The storage facility according to claim 5, wherein the compression member comprises a compressor and an electrical source supplying the compressor.

8. The storage facility according to claim 1, wherein the secondary branch comprises a non-return valve arranged between the insulation layer and the suction member.

9. The storage facility according to claim 1, comprising at least two suction devices, the tank comprising a first insulation layer in contact with the gas in the liquid state contained in the tank and a second insulation layer surrounding the first insulation layer, the secondary branch of a first suction device being fluidly connected to the first insulation layer, the secondary branch of a second suction device being fluidly connected to the second insulation layer.

10. The storage facility according to claim 1, wherein the suction member is configured to suction in at most 14 $m^3$ of gas per hour within +/−25%.

11. The storage facility according to claim 1, wherein the gas-consuming device is selected from an internal combustion engine, a gas boiler, a gas combustion unit, and an electricity generator.

* * * * *